(12) United States Patent
Krstić et al.

(10) Patent No.: US 8,943,550 B2
(45) Date of Patent: Jan. 27, 2015

(54) FILE SYSTEM ACCESS FOR ONE OR MORE SANDBOXED APPLICATIONS

(71) Applicant: Apple Inc., Cupertino, CA (US)

(72) Inventors: Ivan Krstić, San Francisco, CA (US); Love Hörnquist Astrand, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/631,715

(22) Filed: Sep. 28, 2012

(65) Prior Publication Data

US 2013/0185764 A1 Jul. 18, 2013

Related U.S. Application Data

(60) Provisional application No. 61/632,101, filed on Jan. 17, 2012.

(51) Int. Cl.
*G06F 17/30* (2006.01)
*G06F 7/04* (2006.01)
*G06F 11/30* (2006.01)

(52) U.S. Cl.
USPC .................................. 726/2; 726/27; 713/193

(58) Field of Classification Search
None
See application file for complete search history.

(56) References Cited

U.S. PATENT DOCUMENTS

| | | | |
|---|---|---|---|
| 5,551,038 A | 8/1996 | Martin | |
| 6,466,983 B1 | 10/2002 | Strazza | |
| 6,535,867 B1 | 3/2003 | Waters | |
| 6,691,113 B1 | 2/2004 | Harrison et al. | |
| 6,691,230 B1 | 2/2004 | Bardon | |
| 6,836,888 B1 | 12/2004 | Basu et al. | |
| 7,587,426 B2 | 9/2009 | Fujiwara et al. | |
| 7,725,737 B2 | 5/2010 | Konanka et al. | |
| 8,103,779 B2 | 1/2012 | Belkin et al. | |

(Continued)

FOREIGN PATENT DOCUMENTS

EP 0 940 960 A1 9/1999

OTHER PUBLICATIONS

Hubbard, Jordan, "Mac OS X—From the Server Room to Your", Apple Inc., downloaded from http://www.slideshare.net/guest4c923d/jordan-hubbard-talk-lisapresentation, Nov. 17, 2008, 117 pages.

(Continued)

*Primary Examiner* — Dede Zecher
*Assistant Examiner* — Trang Doan
(74) *Attorney, Agent, or Firm* — Blakely, Sokoloff, Taylor & Zafman LLP (57) ABSTRACT

Methods, systems, and machine-readable storage medium are described wherein, in one embodiment, identifiers, such as bookmarks, are used to allow access to files or folders in a sandboxed environment. One or more applications are restricted by an access control system, which can be, for example, a trusted software component of an operating system. In one embodiment, the bookmarks or other identifiers allow an application to have access to a file even if the file is renamed or moved by a user while the application has been terminated. In one embodiment, a resource manager, or other trusted access control system, can interact with an application to allow for the use of bookmarks in an environment in which a sandbox application controls access to the files such that each application must make a request to the sandbox application in order to obtain access to a particular file or folder.

19 Claims, 6 Drawing Sheets

(56) References Cited

U.S. PATENT DOCUMENTS

| | | | |
|---|---|---|---|
| 2002/0046281 A1* | 4/2002 | Cope | 709/227 |
| 2002/0066022 A1 | 5/2002 | Calder et al. | |
| 2004/0133777 A1 | 7/2004 | Kiriansky et al. | |
| 2005/0149726 A1* | 7/2005 | Joshi et al. | 713/164 |
| 2006/0021029 A1 | 1/2006 | Brickell et al. | |
| 2006/0075464 A1 | 4/2006 | Golan et al. | |
| 2007/0136279 A1 | 6/2007 | Zhou et al. | |
| 2007/0289006 A1* | 12/2007 | Ramachandran et al. | 726/10 |
| 2008/0005472 A1 | 1/2008 | Khalidi | |
| 2008/0127292 A1 | 5/2008 | Cooper et al. | |
| 2008/0184336 A1 | 7/2008 | Sarukkai et al. | |
| 2008/0263193 A1* | 10/2008 | Chalemin et al. | 709/224 |
| 2010/0011447 A1* | 1/2010 | Jothimani | 726/27 |
| 2010/0312749 A1 | 12/2010 | Brahmadesam et al. | |
| 2010/0312966 A1 | 12/2010 | De Atley et al. | |
| 2012/0023091 A1* | 1/2012 | Fox et al. | 707/709 |

OTHER PUBLICATIONS

Mazzoleni, P. et al., "XACML Policy Integration Algorithms (Not to be confused with XACML Policy Combination Algorithms!)", SACMAT '06, Lake Tahoe, CA, Jun. 7-9, 2006, 9 pages.

Yee, Ka-Ping "Secure Interaction Design and the Principle of Least Authority", CHI 2003, Fort Lauderdale, FL, Apr. 5-10, 2003, 4 pages.

PCT International Search Report and Written Opinion of the International Searching Authority for PCT Application No. PCT/US2013/021486, Mailing Date Apr. 2, 2013 (12 pages).

PCT International Preliminary Report on Patentability for PCT/US2013/021486, mailed Jul. 31, 2014.

* cited by examiner

FILE SYSTEM ACCESS FOR ONE OR MORE SANDBOXED APPLICATIONS

CROSS-REFERENCE TO RELATED APPLICATIONS

This application claims benefit of U.S. Provisional Application No. 61/632,101, filed Jan. 17, 2012, and this provisional application is hereby incorporated herein by reference. This application is related to U.S. patent application Ser. No. 13/007,472, filed Jan. 14, 2011, and U.S. patent application Ser. No. 12/790,451, filed May 28, 2010, and U.S. patent application Ser. No. 13/007,480, filed Jan. 14, 2011.

BACKGROUND OF THE INVENTION

Security concerns for all types of processor based electronic devices and particularly for computing devices have become significant. Malicious code such as viruses, worms, malware, and other code can have effects ranging from relatively benign, such as displaying messages on a screen to taking control of a device, running processes, transmitting and or deleting files, etc. Many of these attacks are directed at computing devices, such as workstations, servers, desktop computers, notebook and handheld computers, and other similar devices. Many of these computing devices can run one or more application programs which a user may operate to perform a set of desired functions.

A number of methodologies have been used in an attempt to reduce or eliminate both attacks and the influence of malicious or defective code. Generally, these methodologies include detection, prevention, and mitigation and can include attempts to scan and identify and isolate malicious code. Additionally, some methodologies have been used to limit the amount of damage malicious code is capable of performing by restricting the amount of access granted to un-trusted applications. Prior methodologies, however, lack a unified and systemic approach that provides a consistent and persistent method of accessing resources outside of the restricted environment, especially if the name or location of those resources should change.

SUMMARY OF THE DISCLOSURE

Embodiments of the invention relate generally to the field of secure computing, and more particularly to restricting resources used by a program. According to one aspect of the invention, identifiers are provided to allow access to files or folders in a sandboxed environment in which one or more applications are sandboxed by an access control system. Such access control system can be part of a trusted software component, such as a trusted software component of an operating system. The identifier can be a bookmark, or some other identifier, and can allow an application to access a file even if the file is renamed or moved by a user while the application has been terminated. Previously, if a file or folder outside of a sandboxed environment were to be moved or renamed, an application using that file or folder would not have any knowledge about the renaming or moving of the file or folder and would not be able to obtain access.

However, embodiments of the invention allow a resource manager, or some other trusted access control system, to interact with an application (or "app") and enable the use of bookmarks in that environment. In a sandbox environment, a sandbox application controls access to the files in a manner such that that each application must make a request, in one embodiment, to the sandbox application in order to obtain access to a particular file or folder. Specifically, embodiments of the invention will not allow an application to access a file or folder without some indication that it is the user's intent to access such file or folder to prevent situations where malicious code will attempt surreptitious access to sensitive system resources. However, once user intent is specified by the selection of a file, the selection can persist, in some embodiments, across application sessions.

It is to be noted that the invention is not limited to the embodiments disclosed in the above summary, as the summary does not include an exhaustive list of all aspects of the present invention. Other features of the present invention will be apparent from the accompanying drawings and from the detailed description which follows. Moreover, it is contemplated that the invention includes all systems and methods that can be practiced from all suitable combinations of the various aspects summarized above, and also those disclosed in the Detailed Description below.

BRIEF DESCRIPTION OF THE DRAWINGS

Embodiments of the invention are illustrated by way of example, and not limitation, in the figures of the accompanying drawings in which like references indicate similar elements.

DETAILED DESCRIPTION

Various embodiments for managing file access for one or more sandboxed applications are described in the description and drawings below. The following description and drawings are illustrative of the invention and are not to be construed in a liming manner. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Although the processes are described below in terms of some sequential operations, it should be appreciated that some of the operations described may be performed in a different order. Moreover, some operations may be performed in parallel rather than sequentially.

Restricted operating environments are one way to limit the damage potential of programs executing malicious code. A restricted operating environment can include such environments in which an operating system enforces sandboxing mechanisms on applications, which execute on the operating system. These sandboxing mechanisms can include restrictions on the memory that an application can access, such as the DRAM or other main memory of a computing device, as well as restrictions on access to files stored on a non-volatile storage device, such as a hard drive, or a flash memory device such as a solid state disk. Examples of restricted operating environments are described in co-pending U.S. patent application Ser. No. 13/007,472, filed Jan. 14, 2011, and U.S. patent application Ser. No. 12/790,451, filed May 28, 2010, and U.S. patent application Ser. No. 13/007,480, filed Jan. 14, 2011, and all of these patent applications are hereby incorporated herein by reference in their entirety.

When a sandboxing application restricts access to files, it can do so by requiring a demonstration of user intent through trusted facilities, such as a user's selection of a file through a trusted system resource such as an open file dialog box or panel provided by a trusted element of an operating system. Hence, when an application is executing, the user can provide the necessary indication of trust by selecting files through an open dialog box or a saved dialog box or other dialog box or panel which is provided by a trusted system resource.

However, there are certain instances where an application seeks access to a file or folder, but does so without a user interaction that indicates the trustworthiness of the file or folder. For example, an email application may wish to access a download folder in order to store a download in an email. This can occur upon launching the email program, but the launching of the email program does not include the user's selection of a particular download folder. Hence, in this case, the email application would be denied access to the folder after it has been re-launched. Another example in which an application would be denied access in a restricted environment is if the application uses a project or collection file, such as the project file used for the "Final Cut Pro" movie editing software application. The project or collection file can be considered a directory, which contains metadata and path names specifying various movies and other content, which are used together to provide a presentation. In a typical use of the project file, the user opens the project file from within the application through the use of an open dialog box. In this case, the system does not need to verify the trustworthiness of the file because the user is assumed to be trusted and the user's action to select the file indicates the trustworthiness of the file. However, the application will or may need access to the files referred to within the project or collection, and access to those files will be denied in a restricted operating environment, which requires a user indication of trustworthiness for a particular file.

Figure 1A:
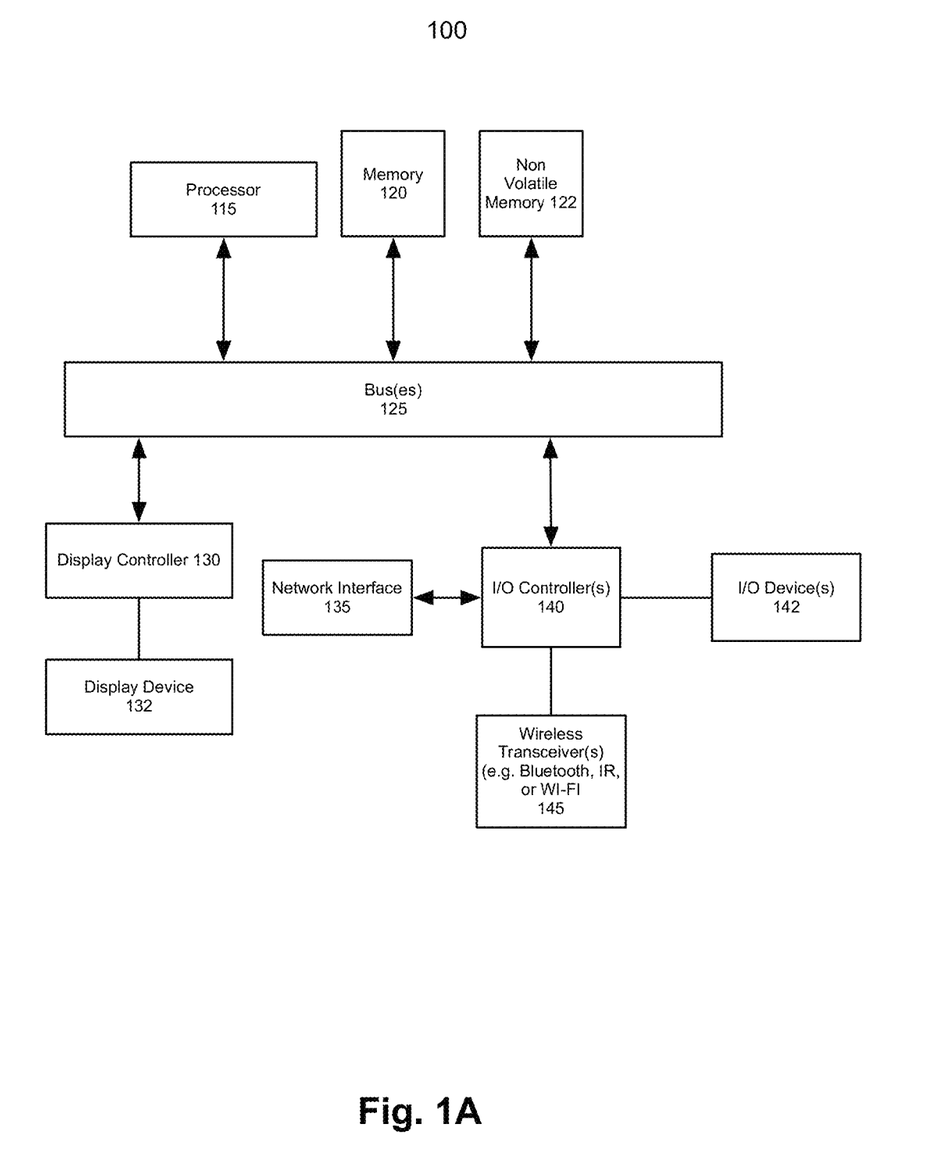
FIG. 1A shows an example of a data processing system which may be comprised of one or more of the embodiments described herein.

Any one of the methods described herein can be implemented on a variety of different data processing devices, including, but not limited to general purpose computer systems, special purpose computer systems, embedded computer systems, etc. For example, the data processing system, which may use any one of the methods described herein, may include a desktop computer or a laptop computer; a mobile device such as a tablet computer, a smart phone, or a cellular telephone; a personal digital assistant (PDA); or some other form of embedded electronic device or a consumer electronic device. FIG. 1A shows one example of a typical data processing system, which may be used with the present invention. Note that while FIG. 1A illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 1A may also be used with the present invention. The data processing system of FIG. 1A may be a Macintosh computer from Apple Inc. of Cupertino, Calif.

As shown in FIG. 1A, the data processing system 100 includes one or more buses 125, which serve to interconnect the various components of the system. One or more processors 115 are coupled to the one or more buses 125 as is known in the art. Memory 120 may be DRAM or non-volatile RAM or may be flash memory or other types of memory. This memory is coupled to the one or more buses 125 using techniques known in the art. The data processing system 100 can also include non-volatile memory 122, which may be a hard disk drive or a flash memory or a magnetic optical drive or magnetic memory or an optical drive or other types of memory systems, which maintain data even after power is removed from the system. The non-volatile memory 122 and the memory 120 are both coupled to the one or more buses 125 using known interfaces and connection techniques. A display controller 130 is coupled to the one or more buses 125 in order to receive display data to be displayed on a display device 132 which can display any one of the user interface features or embodiments described herein. The display device 132 can include an integrated touch input to provide a touch screen.

The data processing system 100 can also include one or more input/output (I/O) controllers 140 which provide interfaces for one or more I/O devices, such as one or more mice, touch screens, touch pads, joysticks, and other input devices including those known in the art and output devices (e.g. speakers). The input/output devices 142 are coupled through one or more I/O controllers 140 as is known in the art. While FIG. 1A shows that the non-volatile memory 122 and the memory 120 are coupled to the one or more buses directly rather than through a network interface, it will be appreciated that the data processing system may utilize a non-volatile memory which is remote from the system, such as a network storage device which is coupled to the data processing system through a network interface 135 such as a modem or Ethernet interface or wireless interface, such as a wireless Wi-Fi transceiver 145 or a wireless cellular telephone transceiver or a combination of such transceivers.

As is known in the art, the one or more buses 125 may include one or more bridges or controllers or adapters to interconnect between various buses. In one embodiment, the I/O controller 140 includes a USB adapter for controlling USB peripherals and can control an Ethernet port or a wireless transceiver or combination of wireless transceivers. It will be apparent from this description that aspects of the present invention may be embodied, at least in part, in software. That is, the techniques may be carried out in a data processing system in response to its processor executing a sequence of instructions contained in a memory such as the memory 120 or the non-volatile memory 122 or a combination of such memories which together may embody the non-transitory machine readable storage medium. In various embodiments, hardwired circuitry may be used in combination with software instructions to implement the present invention. Thus the techniques are not limited to any specific combination of hardware circuitry and software, or to any particular source for the instructions executed by the data processing system.

Figure 1B:
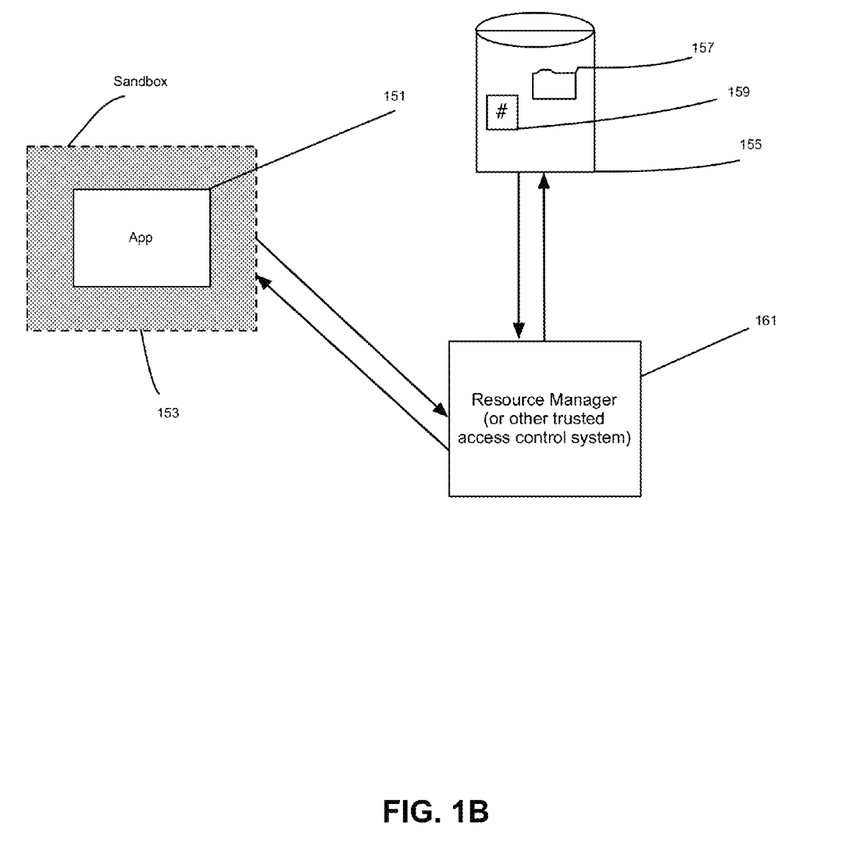
FIG. 1B is a block diagram illustrating a system for operating a program or application in a restricted operating environment according to one embodiment of the invention.

FIG. 1B shows an operating environment, which may include a data processing system as in FIG. 1A, according to an embodiment of the present invention. The operating environment uses a resource manager or other trusted access control system 161 to provide bookmarks to a sandboxed app or application in order to allow the application to obtain access in the restricted environment even after the application has been terminated and then re-launched. The resource manager 161 can be an access control system within an operating system, and executable object code of the resource manager 161 can be cryptographically signed or otherwise authenticated in order to verify its trustworthiness in some embodiments. A storage device 155 is accessed through resource manager 161. In one embodiment, the resource manager accesses the storage device 155 through a file system. The app 151 accesses the file or folder such, as the file 159 or folder 157 through the resource manager 161, which in turn accesses the storage device 155 through the file system. The storage device 155 can be a hard drive or flash drive or other non-volatile storage known in the art. App 151 is sandboxed by sandbox 153 such that its use of memory in main memory can be limited by the sandbox application and app 151 can only get access to files or folders outside of its package or container by requesting access through the resource manager 161. Resource manager 161 can allow access to a file when the user executes the application and requests the file through an open or save dialog box or panel, which is provided by a trusted system software component. For example, if the user selects from a preferences panel a particular download folder to use or some other folder to use for some purpose of the application, the application can use that folder during its current execution. However, when the application is terminated or otherwise quit, and then re-launched, the application cannot reuse or gain access to that folder or file without user interaction.

Figure 2A:
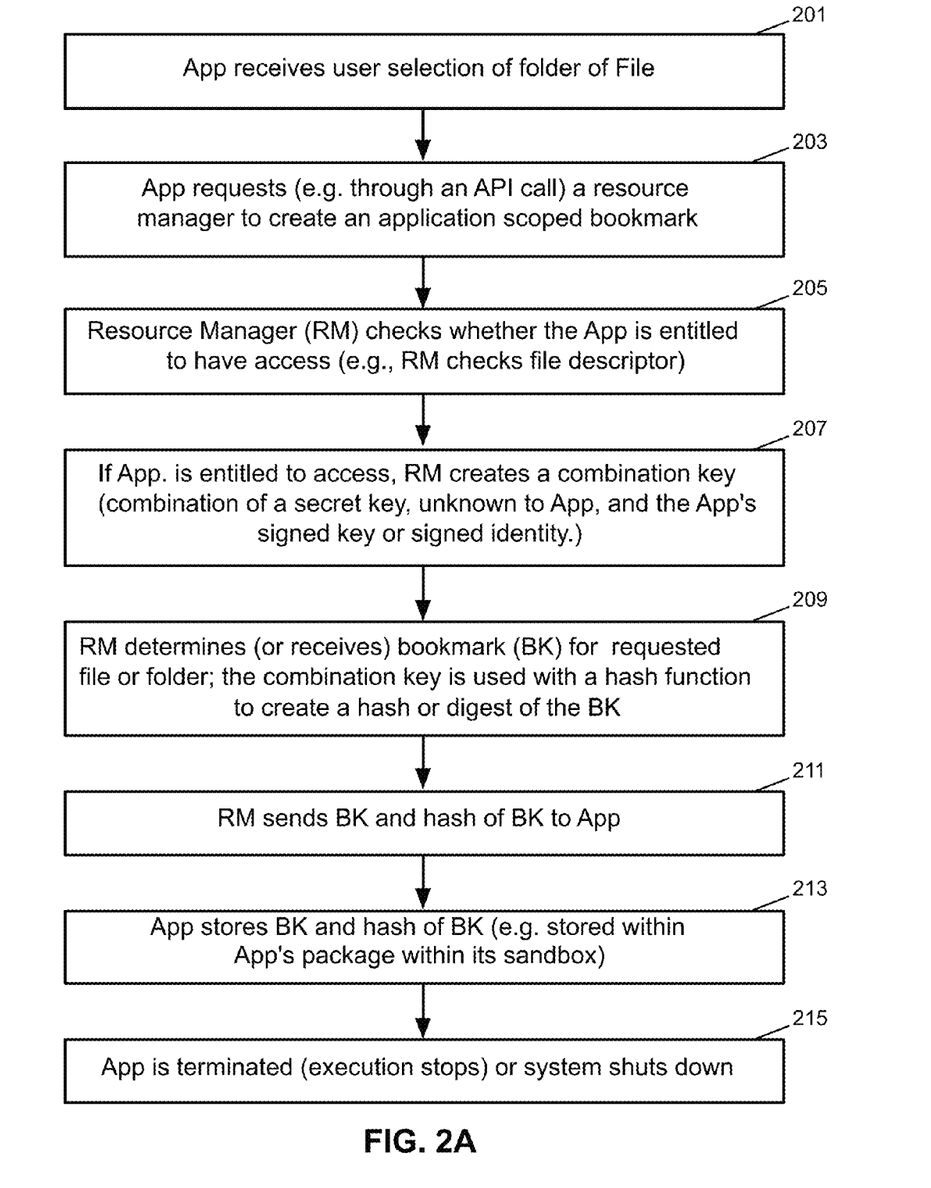
FIG. 2A is a flowchart indicating a method in one embodiment for performing app scoped bookmarking to allow persistent access to files in a restricted operating environment according to one embodiment of the invention.
Figure 2B:
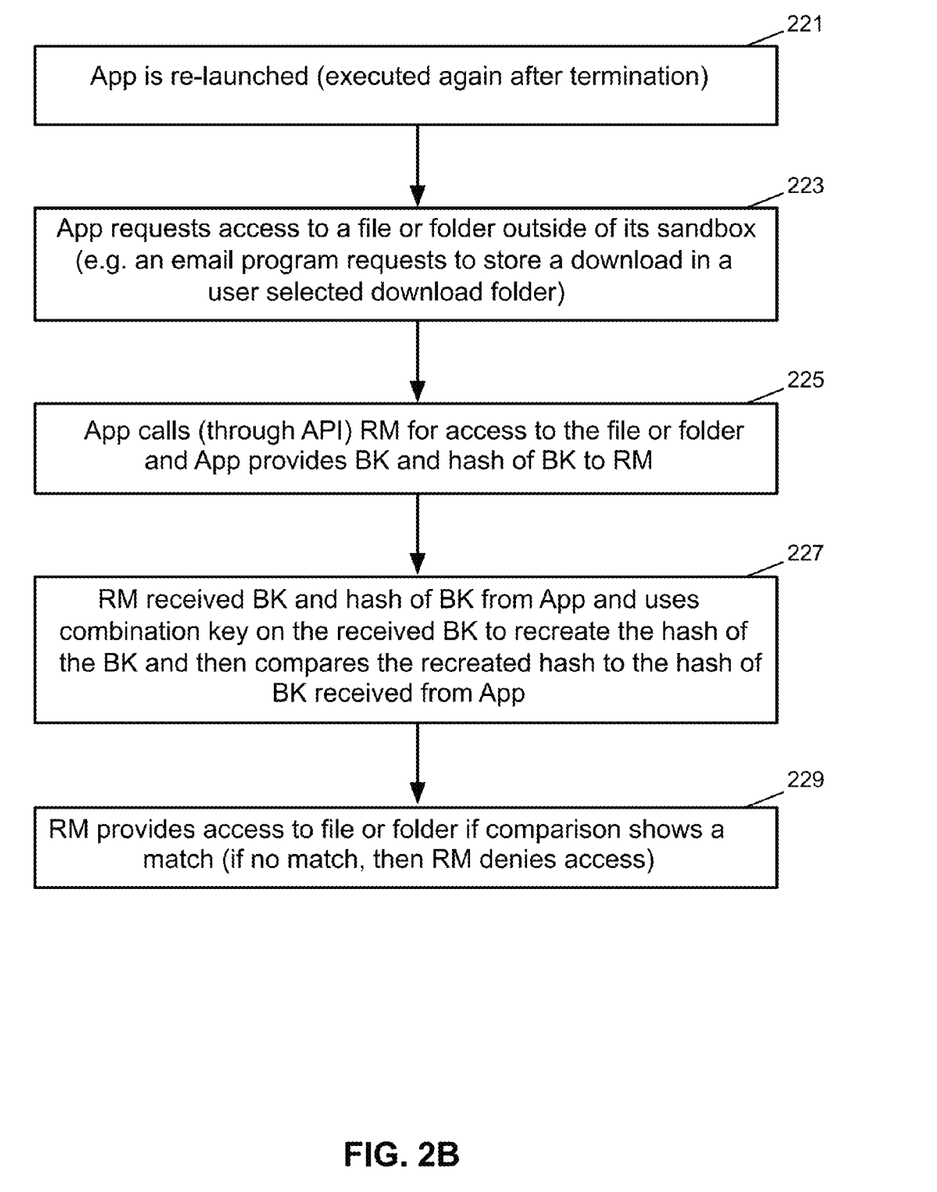
FIG. 2B is a flowchart which illustrates how a re-launched application can obtain access through a bookmark or other identifier in a restricted operating environment according to one embodiment of the invention.

The methods shown in FIG. 2A and FIG. 2B provide an example of how an application or app can be allowed access to a previously trusted file or folder even after the termination of the application. In other words, the system can provide access to a previously trusted file or folder through the use of a security scoped bookmark or other identifier such as a Uniform Resource Locator (URL). The methods shown in FIG. 2A and FIG. 2B relate to a situation in which the application uses application scoped bookmarks to obtain access to a file or folder previously selected by the user. The methods shown in FIG. 2A can begin in operation 201 in which an app receives a user selection of a file or folder while it is executing. Then the app, in response in operation 203 requests a resource manager to create an application scoped bookmark. The request can be performed through an API call to a trusted resource component, such as the resource manager 111. The request can specify a folder or file and also specify the requesting application. In operation 205 the resource manager then checks whether the application is entitled to have access; in one embodiment this can be performed by receiving a file descriptor from the application and then the resource manager checks the file descriptor against the file descriptor for the requested file selected by the user in operation 201. If the application is entitled to have access as determined in operation 205, then the resource manager creates a combination key, using a combination of a secret key, which is unknown to the application, and the app's signed key or signed identity. The resource manager can then determine or receive a bookmark for the requested file or folder in operation 209, and then the combination key can be used with the hash function to create an encrypted location identifier, which is a hash or digest of the bookmark in operation 209. Then in operation 211, the resource manager can send the bookmark and the hash of the bookmark to the app, which can then in operation 213 store the bookmark and hash of the bookmark. In one embodiment, the bookmark and the hash of the bookmark can be encoded within the application's package or container within its sandbox thereby allowing it to have access to the data without obtaining permission from the resource manager. Then in operation 215 the application can be terminated or the system can be shut down. At this point, the restricted operating environment has created an application-scoped bookmark to allow the application access to the previously selected file or folder without requiring further user interaction to indicate the trustworthiness of the file or folder.

FIG. 2B shows the use of the application-scoped bookmark once the application is re-launched, wherein the application is executing again after the termination in operation 215. The re-launching occurs in operation 221, and then in operation 223, the app requests access to a file or folder outside of its sandbox. For example, an email program can request to store a download in a previously user selected download folder. The app, in operation 225 can call, through an API, the resource manager for access to the file or folder (such as the download folder) and the app provides the bookmark and hash of the bookmark, which it stored in operation 213. In operation 227, the resource manager receives the bookmark and the hash of the bookmark from the app and uses the combination key on the received bookmark to cryptographically authenticate the hash of the bookmark by re-encoding URL into a second keyed hash comparing the recreated hash to the hash received from the app. If the comparison shows that they match, then the resource manager authenticates the request and allows access to the file or folder in operation 229. If they do not match, then access is denied.

Figure 3A:
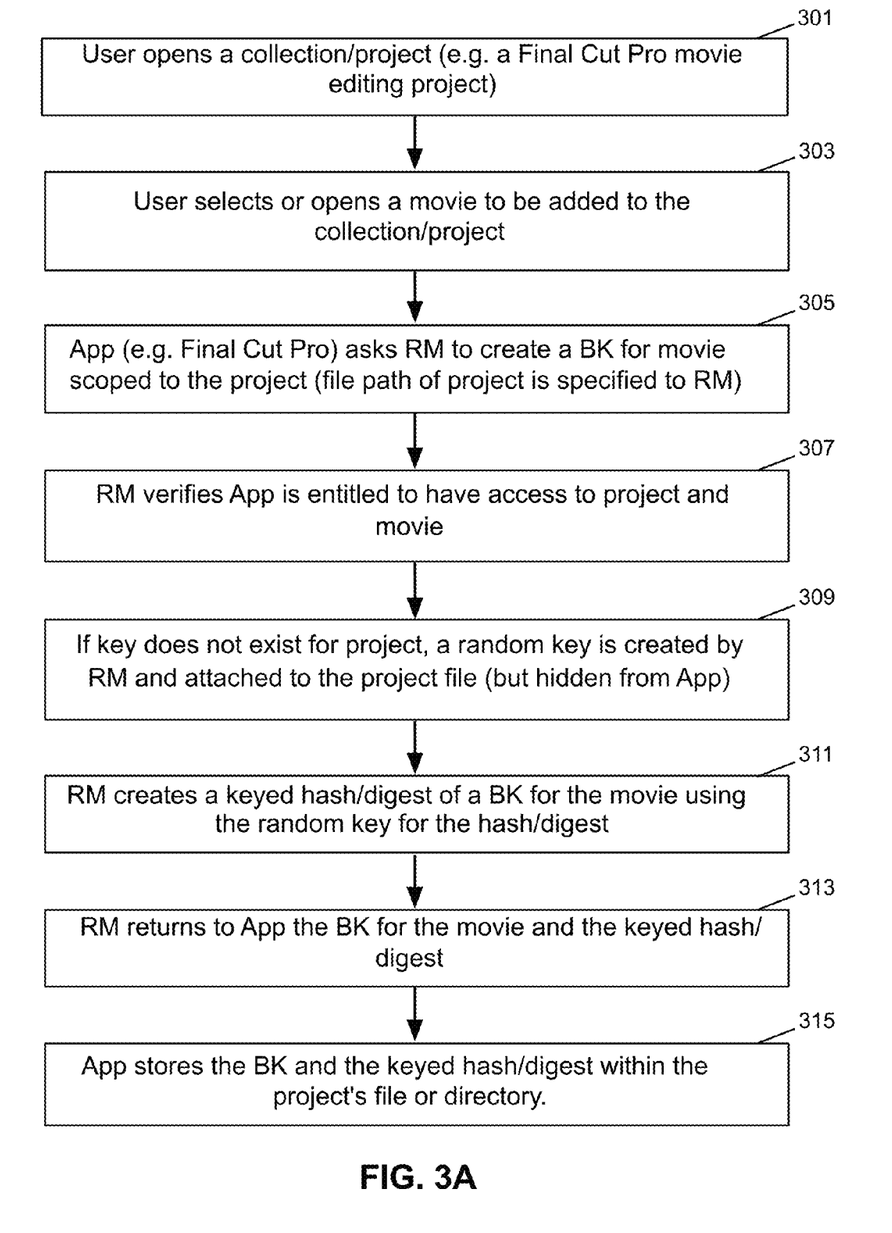
FIG. 3A is a flowchart which illustrates a method of creating a collection scoped bookmark for use in a restricted operating environment according to one embodiment of the invention.
Figure 3B:
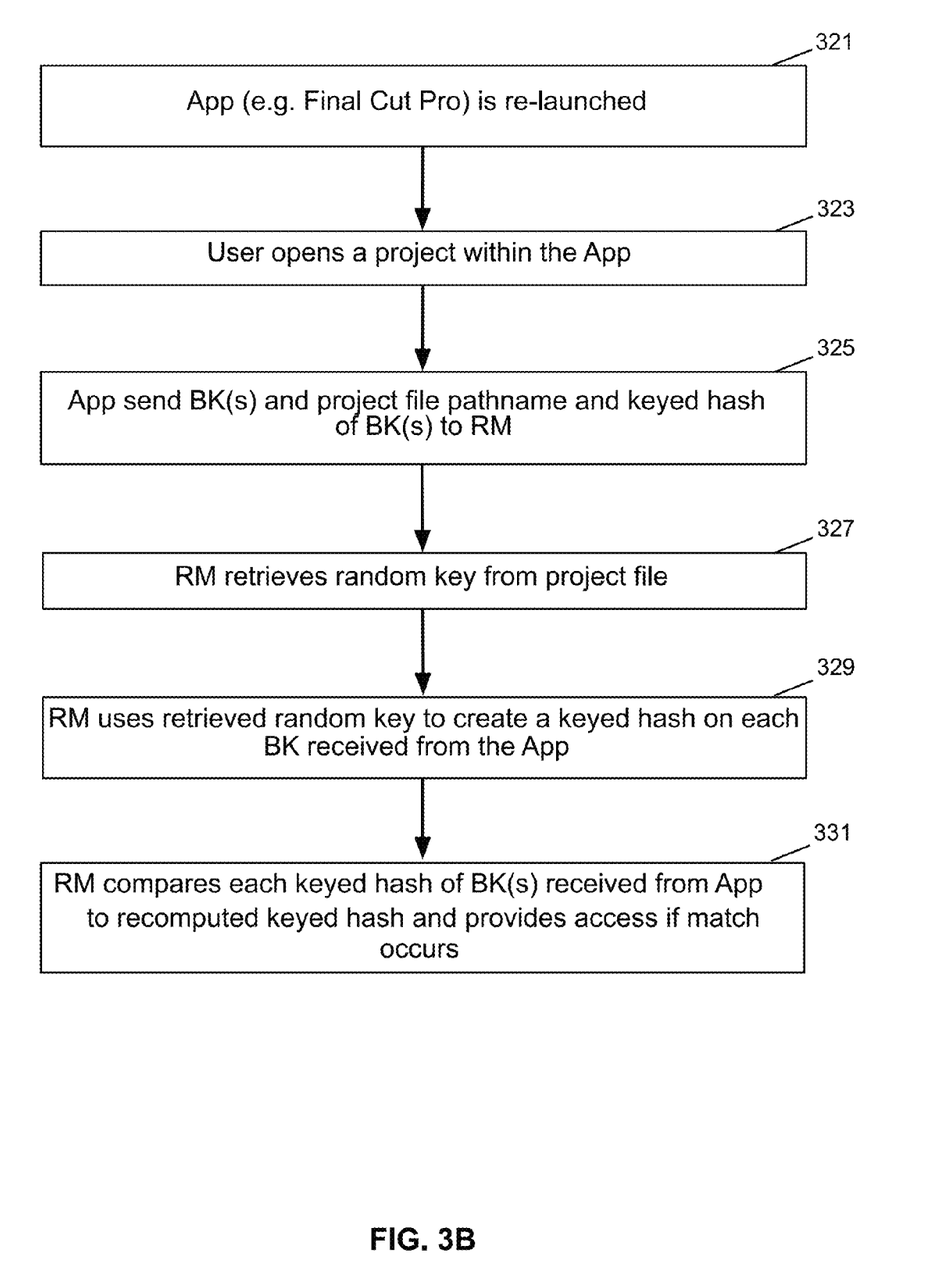
FIG. 3B is a flowchart illustrating a method for allowing access through a project associated with a collection scoped bookmark in a restricted operating environment according to one embodiment of the invention.

FIGS. 3A and 3B show an example of a method according to one embodiment to allow persistent access to files specified in a collection or project, such as a Final Cut Pro movie editing project. The methods shown in FIG. 3A can begin in operation 301 in which a user opens a collection or project using the application. The user's opening provides the indication of trustworthiness with respect to the project or collection when the user uses an open dialog box within the application to open the project if the open dialog box is provided by a trusted system resource such as operating system software, which provides the open dialog box. The user can then, in operation 303, select or open a movie to be added to the project. The application in operation 305 asks the resource manager 111 to create a bookmark for the movie, wherein this bookmark is scoped to the project, which can be specified by the file path name of the project. In one embodiment, the app specifies the project by the file name and provides the file name to the resource manager. In operation 307, the resource manager verifies that the app is entitled to have access to the project and to the specified movie and if it does then in operation 309, the resource manager will create a random key if a key does not exist already for the project and attach the key to the project file. In one embodiment, the key is hidden from the application even though it is attached to the project file. In such embodiment, the resource manager can restrict access to that portion of the file containing the random key by requiring the file system to store the random key in a separate block from the rest of the file blocks or by using other mechanisms known in the art. In operation 311, the resource manager 111 can create a keyed hash or digest of a bookmark for the movie using the random key created in operation 309 for the project file. Then in operation 313, the resource manager returns to the app the bookmark for the movie and also returns the keyed hash/digest. In one embodiment, the bookmark can contain the keyed hash/digest. In operation 315 the app stores the bookmark and the keyed hash/digest within the project's file or directory for reuse as will be explained in connection with FIG. 3B. Operations 303-315 are repeated for each movie or other object to be included in the project or collection. It will be appreciated that the collection or project can be movie projects or music projects or other applications where referenced items represent document libraries used by the application. After operation 315, the application can quit or be terminated or the system can be shut down.

The method shown in FIG. 3B shows the use of the collection scoped bookmark created in the method shown in FIG. 3A. In operation 321, the application is re-launched and then the user opens a project within the application in operation 323. In one embodiment, there is no need to check for the trustworthiness of the project because the system can rely upon the user's selection of a project as an indication of trustworthiness of the project or other file or collection of documents. Then in operation 325, the application sends one or more bookmarks referenced by the project and also sends the project file path name and the keyed hash of the bookmarks to the resource manager 111. Then in operation 327, the resource manager can retrieve the random key from the project file, which was created in operation 309. Then, the resource manager, in operation 329 can use the retrieved random key to create a keyed hash on each bookmark received from the application by virtue of operation 325. Then the resource manager can compare each keyed hash of the bookmarks received from the application to the recomputed keyed hashes of each bookmark and provide access if a match occurs and otherwise deny access. In this matter, it is possible to allow for persistent access to user-selected documents in a collection or project which references those collection of documents.

In the case of the methods shown in FIGS. 3A and 3B, the persistent references are specific to the collection or project that represents a document or set of documents and they are not part of the application's configuration but part of a particular document that the application can open.

On the other hand, the methods shown in FIGS. 2A and 2B are specific to the application which received the user's selection of a file or folder during the execution of the application. The resource manager or other trusted access control system can verify that the bookmark, which can be a URL, was not tampered with and that the same application is attempting to access the previously accessed file, which was selected by a user. Hence, the application scoped bookmark or identifier is specific for a particular application.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. The various aspects, embodiments, implementations, or features of the embodiment can be used separately or in any combination.

The described embodiments can also be embodied as computer readable code on a non-transitory computer readable medium. A non-transitory computer readable medium is any data storage device that can store data which can thereafter be read by a computer system, other than medium designed specifically for propagating transitory signals. Examples of non-transitory computer readable media include floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions. In various embodiments, software-instructions stored on a machine-readable storage medium can be used in combination with hardwired circuitry to implement the present invention. Thus, the techniques are not limited to any specific combination of hardware circuitry and software instructions, or to any particular source for the instructions executed by the data processing system associated with an apparatus for performing one or more of the operations described herein.

What is claimed is:

1. A machine implemented method comprising:
receiving a selection of a resource managed by a restricted operating environment, the resource consisting of a file or folder;
requesting, in response to the selection, a location identifier associated with the resource, wherein the request for the location identifier is serviced by a cryptographically authenticated resource manager;
receiving, in response to the request, a first identifier, and a second identifier, wherein the second identifier is a uniform resource locator (URL), which allows retrieval of the resource if the resource is renamed or moved, and the first identifier is a cryptographically authenticated location identifier consisting of a first keyed hash of the URL; and
storing the first and second identifier on a non-transitory storage device.

2. The method as in claim 1 wherein the resource manager is a trusted access control system of an operating system for a data processing system.

3. The method as in claim 2 further comprising: terminating a first application session after receiving the first and second identifiers for the resource from the resource manager; beginning a second application session after terminating the first application session; and retrieving the resource using the first and second identifiers.

4. The method as in claim 3 further comprising:
requesting access to a selected resource;
providing the first and second identifiers; and
accessing the resource, wherein the resource is renamed or moved between the first and second application session.

5. The method as in claim 4 further comprising authenticating the second identifier by the resource manager, wherein the authenticating includes creating a second keyed hash and comparing the second keyed hash with the first keyed hash.

6. A system to provide a restricted operating environment for managing access to a resource on an electronic computer system, the system comprising:
memory to store instructions and resources;
a storage device coupled to the memory; and
one or more processors coupled to the memory and the storage device, the one or more processors to execute instructions stored in the memory to create the restricted operating environment for managing access to the resource by an application, wherein the restricted operating environment couples with a cryptographically authenticated resource manager, the cryptographically authenticated resource manager to receive a request for a location identifier to access the resource, authenticate the request by determining whether access is allowed to the resource, and send the location identifier and an identifier, wherein the identifier is a uniform resource locator (URL), which allows retrieval of the resource outside of the restricted operating environment if the resource is renamed or moved, and the location identifier is a keyed hash of the URL.

7. The system of claim 6 wherein the restricted operating environment is to restrict access to files and folders located outside of the restricted operating environment.

8. The system of claim 7 wherein the resource manager is a cryptographically authenticated component of a computer operating system.

9. The system of claim 8 wherein the keyed hash is generated and authenticated cryptographically.

10. The system of claim 6 wherein the restricted operating environment is configured to restrict access to main memory.

11. A non-transitory machine-readable storage medium, which provides instructions that, when executed by a processing system, cause the processing system to perform operations managing resource access in a restricted operating environment, the operations comprising:
   receiving a first request to provide a location identifier associated with a resource, the resource consisting of a file or folder, the file or folder representing a collection of one or more user selected files;
   verifying that the first request is entitled to access the resource;
   creating a random key and attaching the random key to the resource;
   creating a first keyed hash using the random key; and
   returning the location identifier associated with the resource, the location identifier including a uniform resource locator (URL) and the first keyed hash, wherein the location identifier provides persistent access to the collection of files represented by the resource.

12. The machine-readable storage medium of claim 11 further comprising:
   receiving a second request to access the resource, the second request including the location identifier;
   retrieving the random key from the resource;
   using the random key to create a second keyed hash;
   comparing the second keyed hash with the first keyed hash; and
   providing access to the resource and the collection of files represented by the resource based on the comparing.

13. The machine-readable storage medium of claim 12 wherein the random key is not accessible by an application with access to the resource.

14. The machine-readable storage medium of claim 13, wherein verifying that the first request is entitled to access the resource includes verifying that a requesting application has access to the resource.

15. The machine-readable storage medium of claim 13 wherein the location identifier is specific to a particular application.

16. The machine-readable storage medium of claim 13 wherein the first hash key is included within the URL.

17. The machine-readable storage medium of claim 13 wherein the URL and first hash key provide consistent access across application sessions.

18. The machine-readable storage medium of claim 17 wherein the URL and first hash key provide consistent access across system power cycles.

19. A non-transitory machine-readable storage medium, which provides instructions that when executed, cause a data processing system to perform a method as in claim 1.

\* \* \* \* \*